(12) United States Patent
Cho et al.

(10) Patent No.: US 12,337,285 B2
(45) Date of Patent: Jun. 24, 2025

(54) SEMIPERMEABLE MEMBRANE FOR WATER TREATMENT, PREPARING METHOD FOR THE SAME, AND POLLUTED WATER TREATMENT SYSTEM INCLUDING THE SAME

(71) Applicant: RESEARCH & BUSINESS FOUNDATION SUNGKYUNKWAN UNIVERSITY, Suwon-si (KR)

(72) Inventors: Hyungkoun Cho, Suwon-si (KR); Youngbeen Kim, Ansan-si (KR); Dongsu Kim, Suwon-si (KR); Sung Hyeon Jung, Hwaseong-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 405 days.

(21) Appl. No.: 17/038,492

(22) Filed: Sep. 30, 2020

(65) Prior Publication Data

US 2021/0101120 A1    Apr. 8, 2021

(30) Foreign Application Priority Data

Oct. 4, 2019    (KR) ........................ 10-2019-0122819

(51) Int. Cl.
| | | |
|---|---|---|
| B01D 69/14 | (2006.01) | |
| B01D 61/02 | (2006.01) | |
| B01D 67/00 | (2006.01) | |
| B01D 69/02 | (2006.01) | |
| C02F 1/30 | (2023.01) | |
| C02F 1/44 | (2023.01) | |
| C02F 101/32 | (2006.01) | |

(52) U.S. Cl.
CPC ......... *B01D 69/145* (2013.01); *B01D 61/027* (2013.01); *B01D 67/0051* (2013.01); *B01D 67/0072* (2013.01); *B01D 69/02* (2013.01); *C02F 1/30* (2013.01); *C02F 1/442* (2013.01); *B01D 2323/04* (2013.01); *B01D 2325/10* (2013.01); *B01D 2325/38* (2013.01); *C02F 2101/32* (2013.01); *C02F 2305/08* (2013.01)

(58) Field of Classification Search
None
See application file for complete search history.

(56) References Cited

U.S. PATENT DOCUMENTS

2009/0143227 A1*   6/2009   Dubrow ................ D06M 11/46
502/406

FOREIGN PATENT DOCUMENTS

| KR | 10-2015-0064422 A | 6/2015 |
|---|---|---|
| KR | 10-2016-0141066 A | 12/2016 |

OTHER PUBLICATIONS

Luo et al., Ultralong Sb2Se3 Nanowire-Based Free-Standing Membrane Anode for Lithium/Sodium Ion Batteries, 8 ACS Appl. Mater. Interfaces 35219,35219-35226 (2016). (Year: 2016).*

(Continued)

*Primary Examiner* — Youngsul Jeong
(74) *Attorney, Agent, or Firm* — NSIP Law

(57) ABSTRACT

The present disclosure relates to a semipermeable membrane for water treatment, including a photoactive layer. The photoactive layer includes a plurality of one-dimensional nano structure bundles and the one-dimensional nano structure is nano-structured so that a surface of the semipermeable membrane for water treatment has a hydrophobicity.

17 Claims, 26 Drawing Sheets

(56) References Cited

OTHER PUBLICATIONS

Baig, Umair, et al. "Facile fabrication of superhydrophobic, superoleophilic photocatalytic membrane for efficient oil-water separation and removal of hazardous organic pollutants." *Journal of Cleaner Production* 208 (2019):904-915. pp. 904-915 (12 pages in English).
Korean Office Action issued Nov. 13, 2020 in a counterpart KR application No. 10-2019-0122819 (8 pages in Korean).

* cited by examiner

[FIG. 1]
10
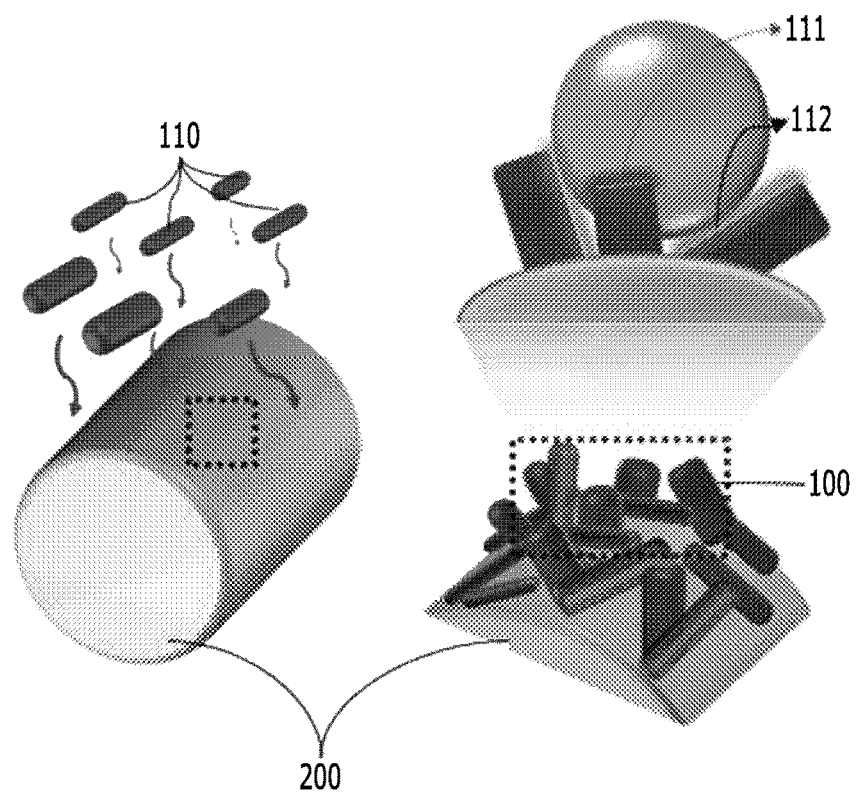

[FIG. 2]
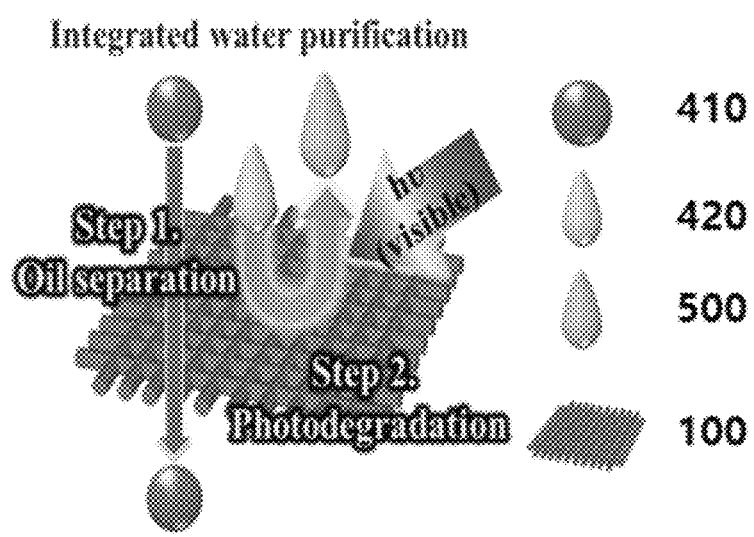

[FIG. 3]
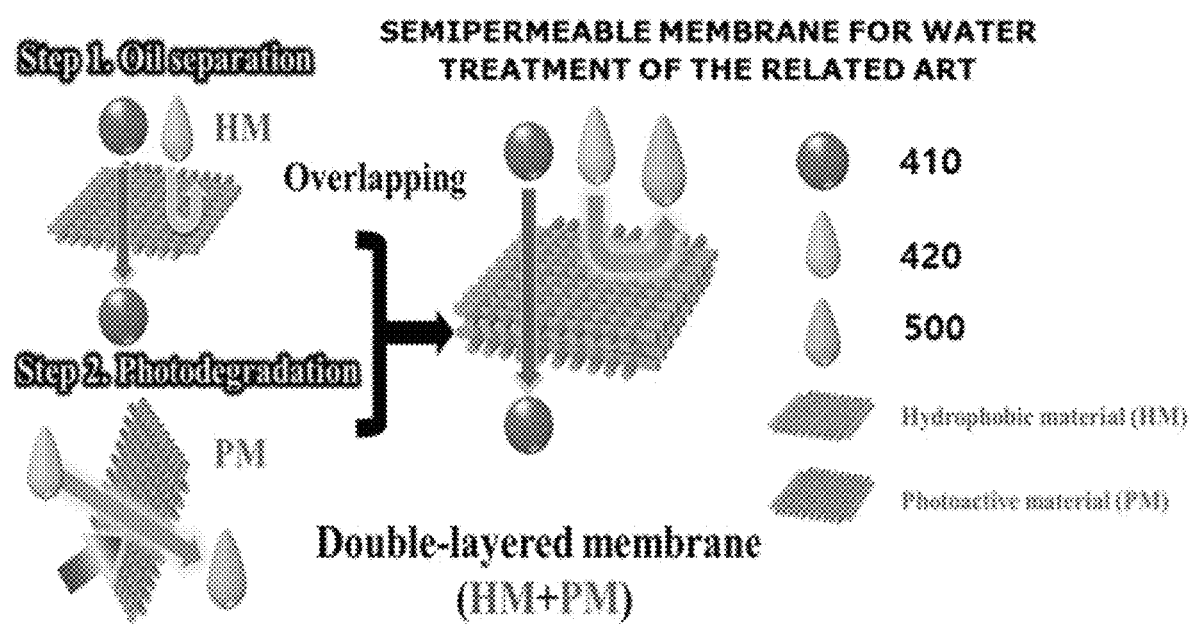

[FIG. 4]
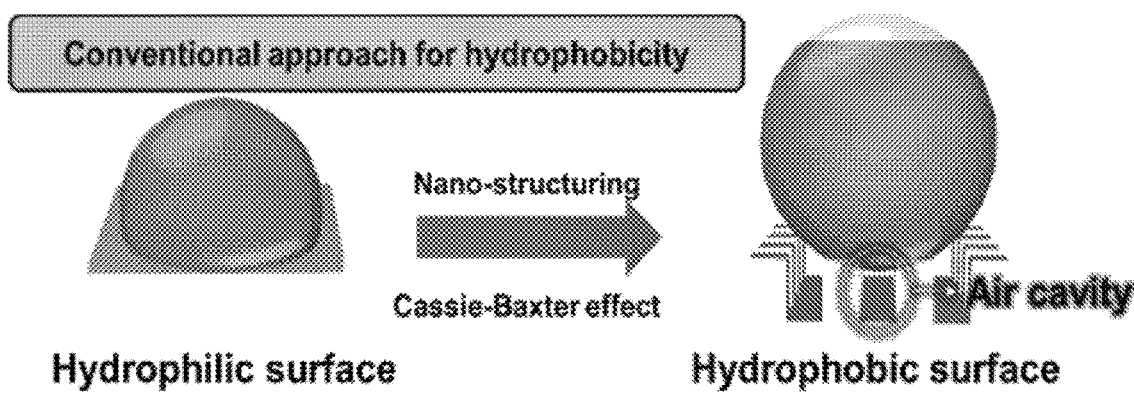

[FIG. 5]
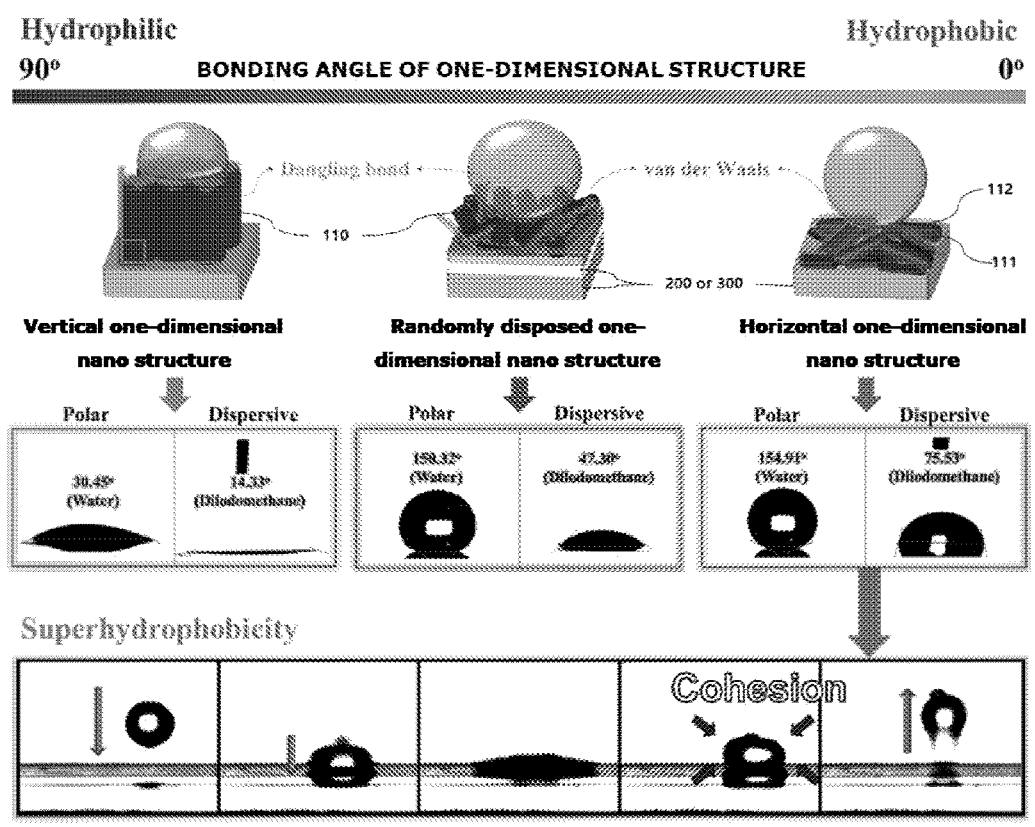

[FIG. 6]
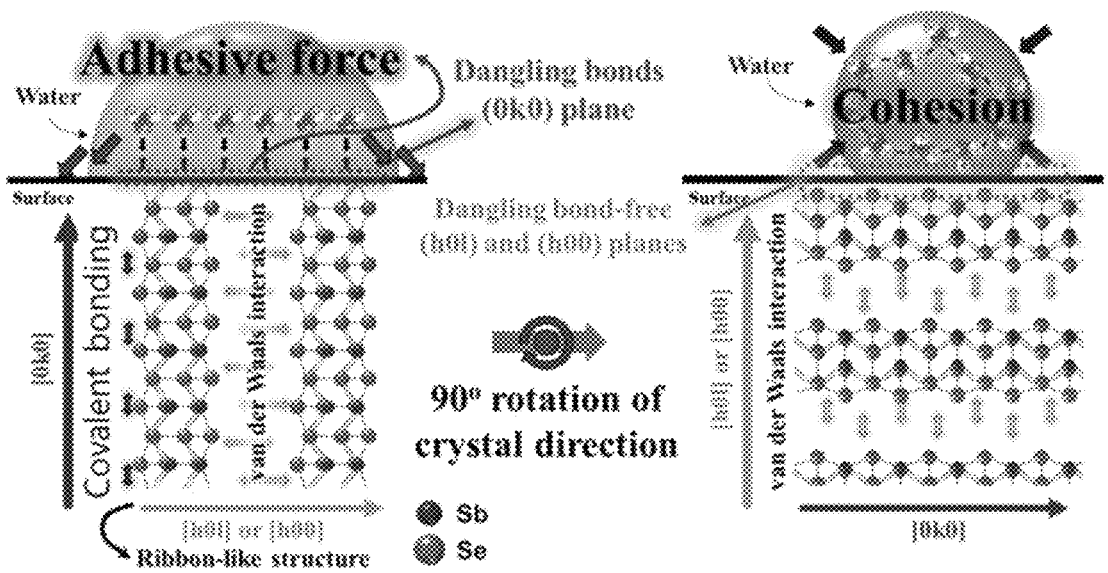

[FIG. 7]
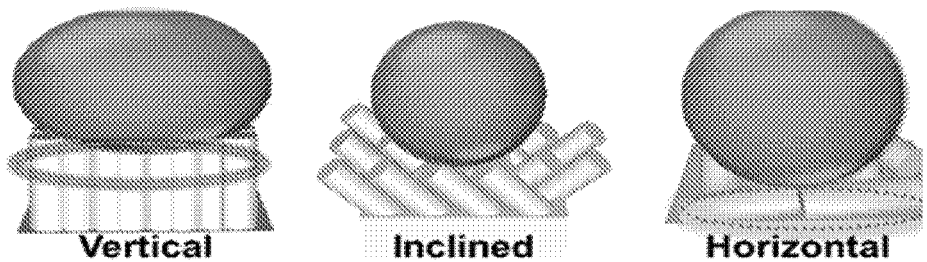

[FIG. 8]
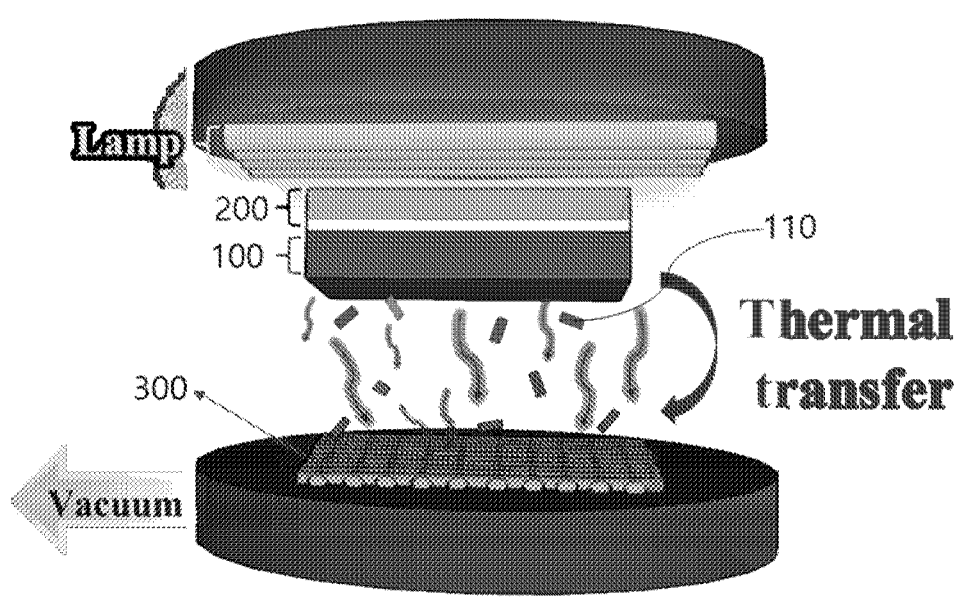

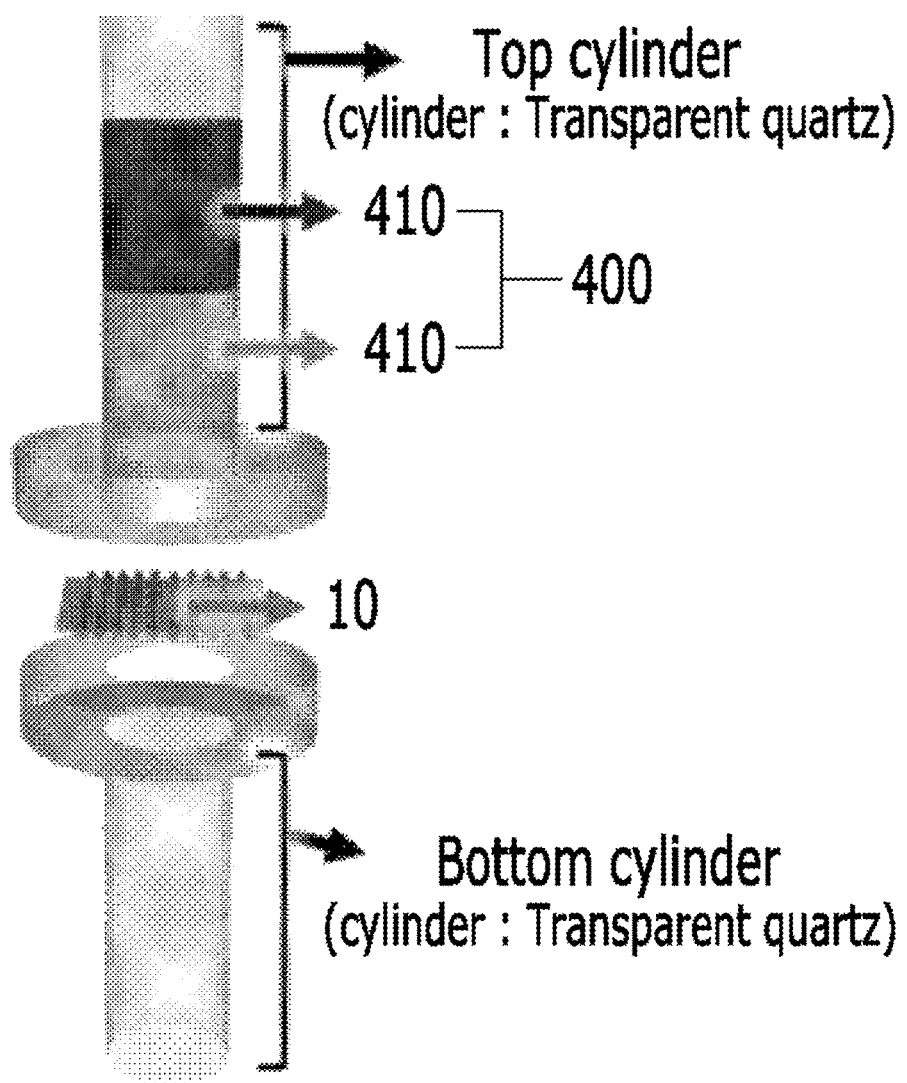
[FIG. 9]

[FIG. 10a]
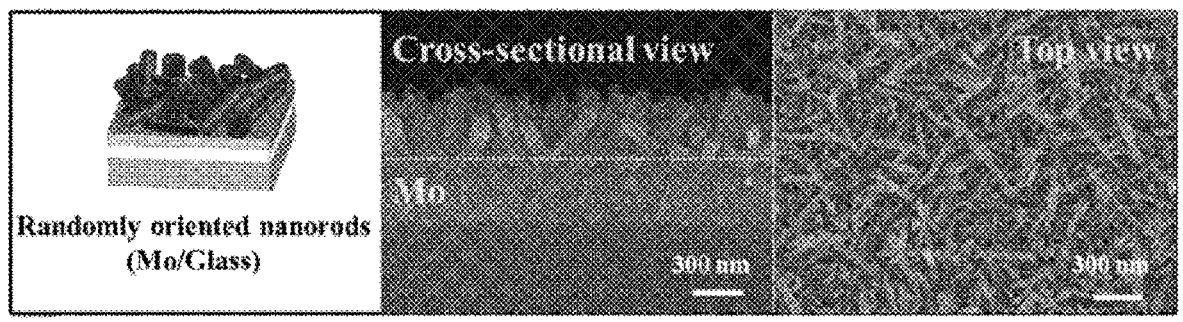

[FIG. 10b]
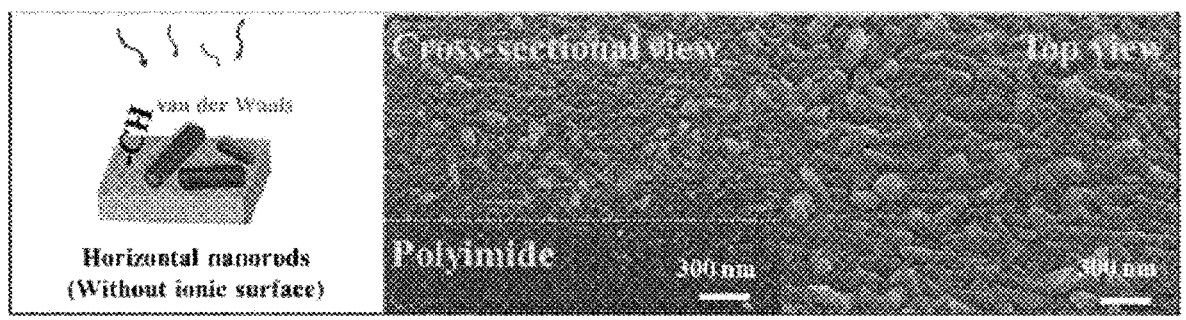

[FIG. 10c]
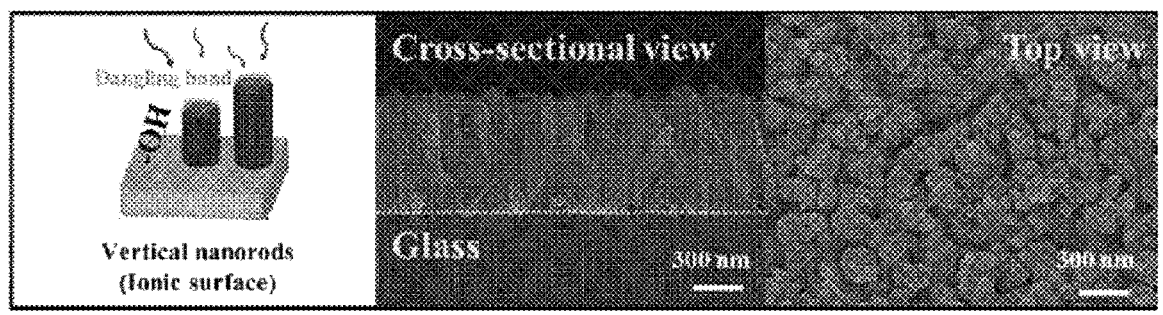

[FIG. 11]
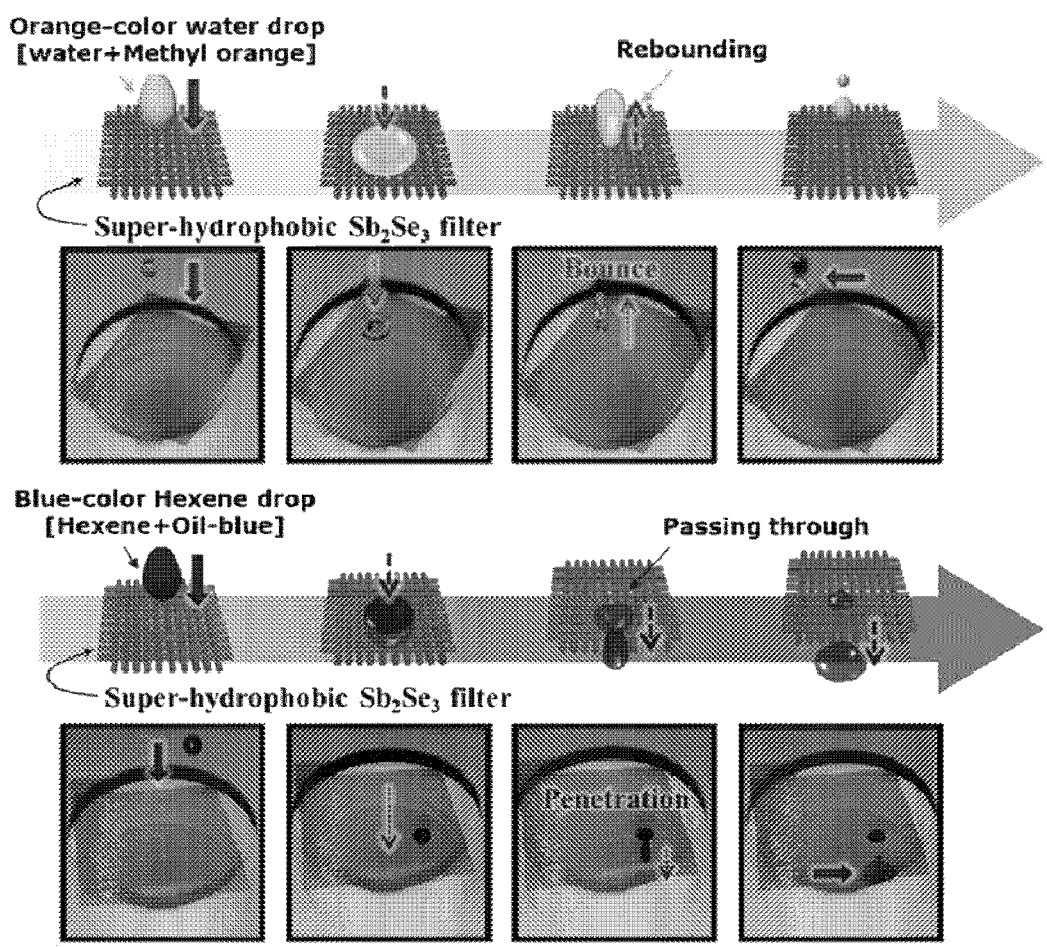

[FIG. 12a]
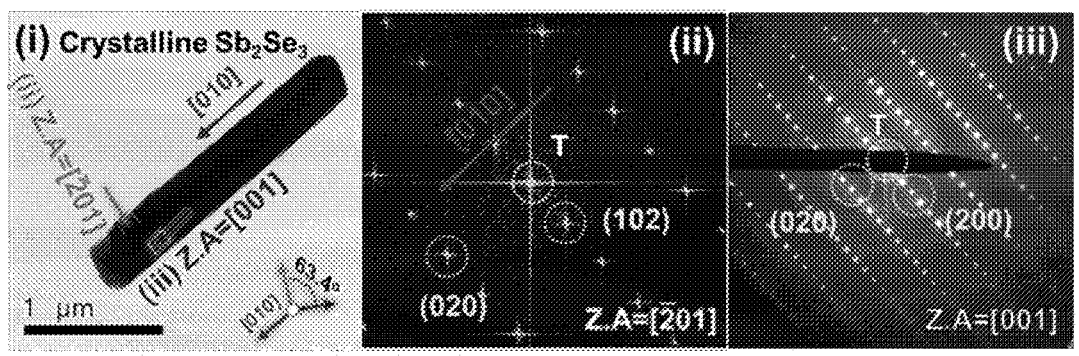

[FIG. 12b]
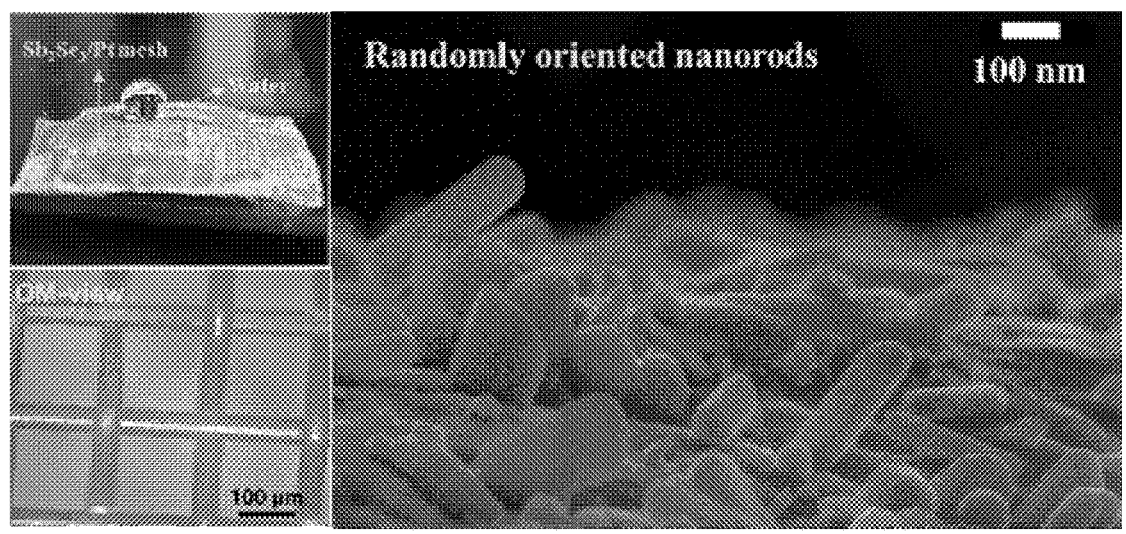

[FIG. 12c]
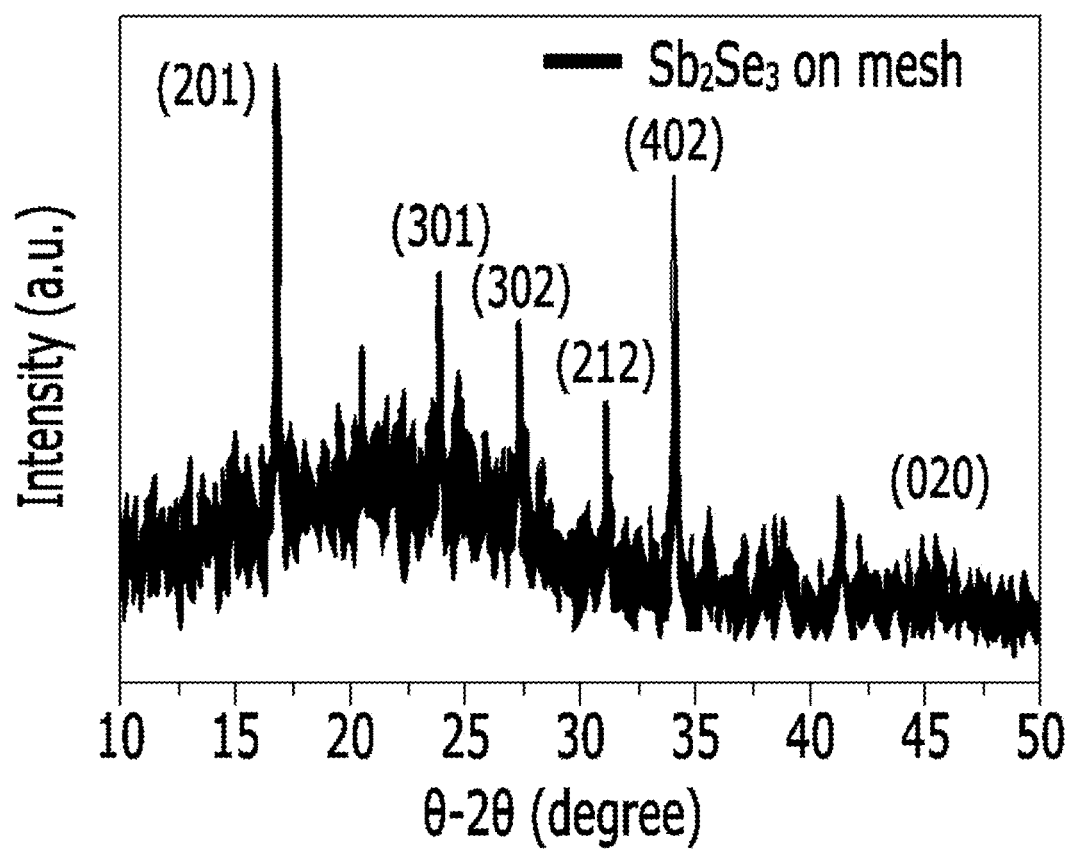

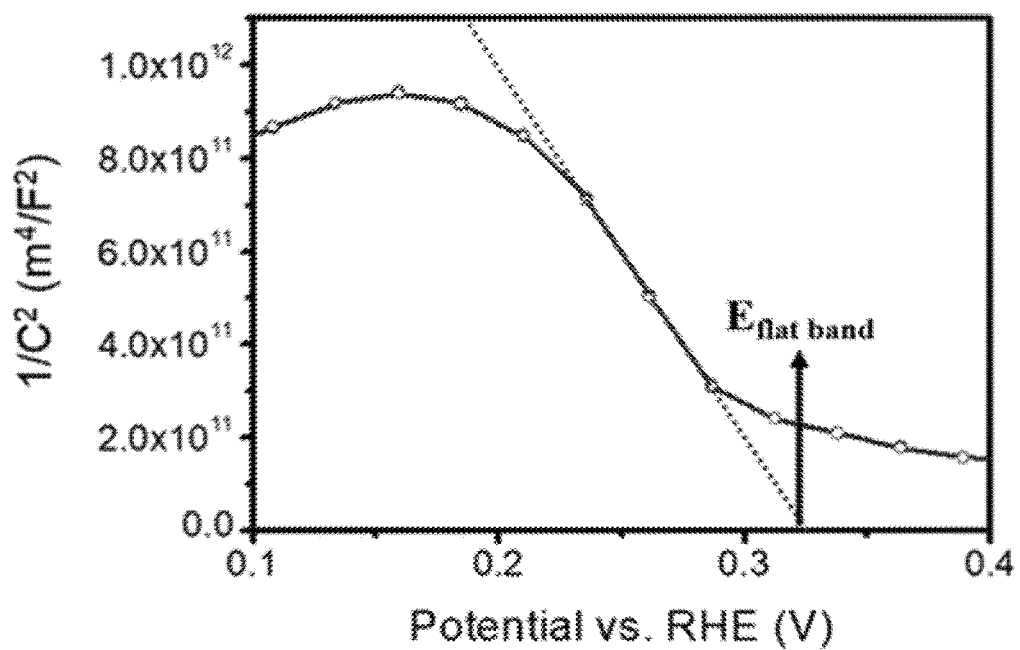
[FIG. 13a]

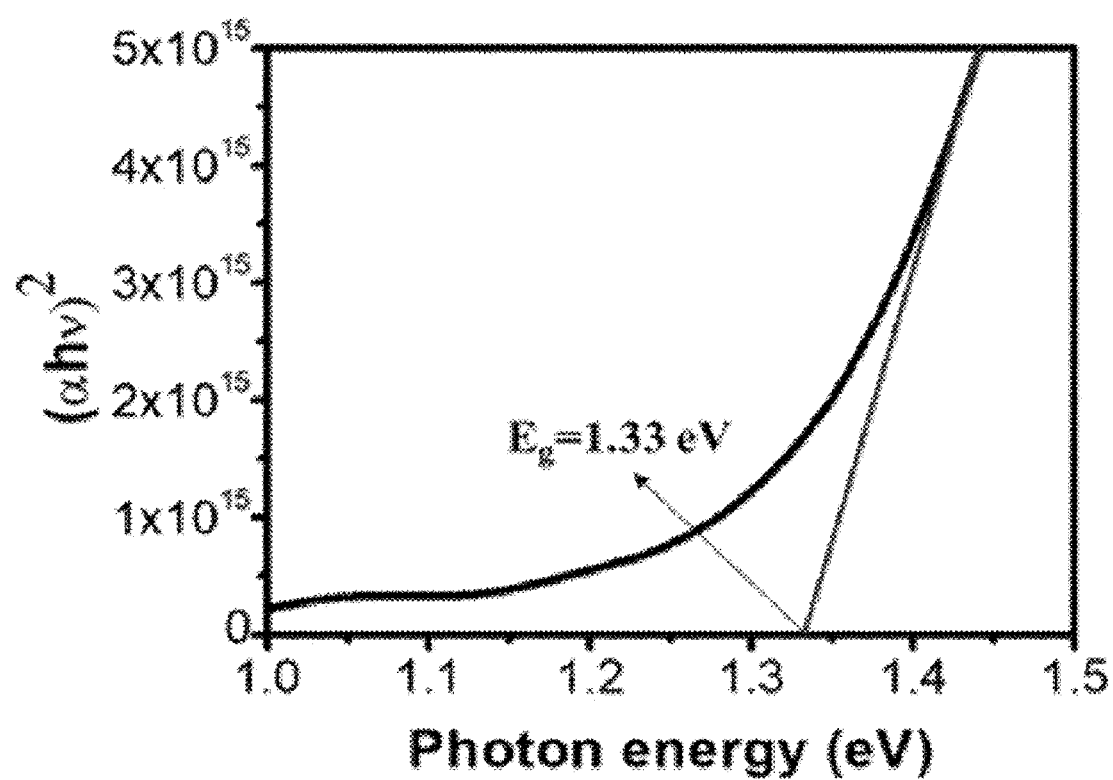
[FIG. 13b]

[FIG. 13c]
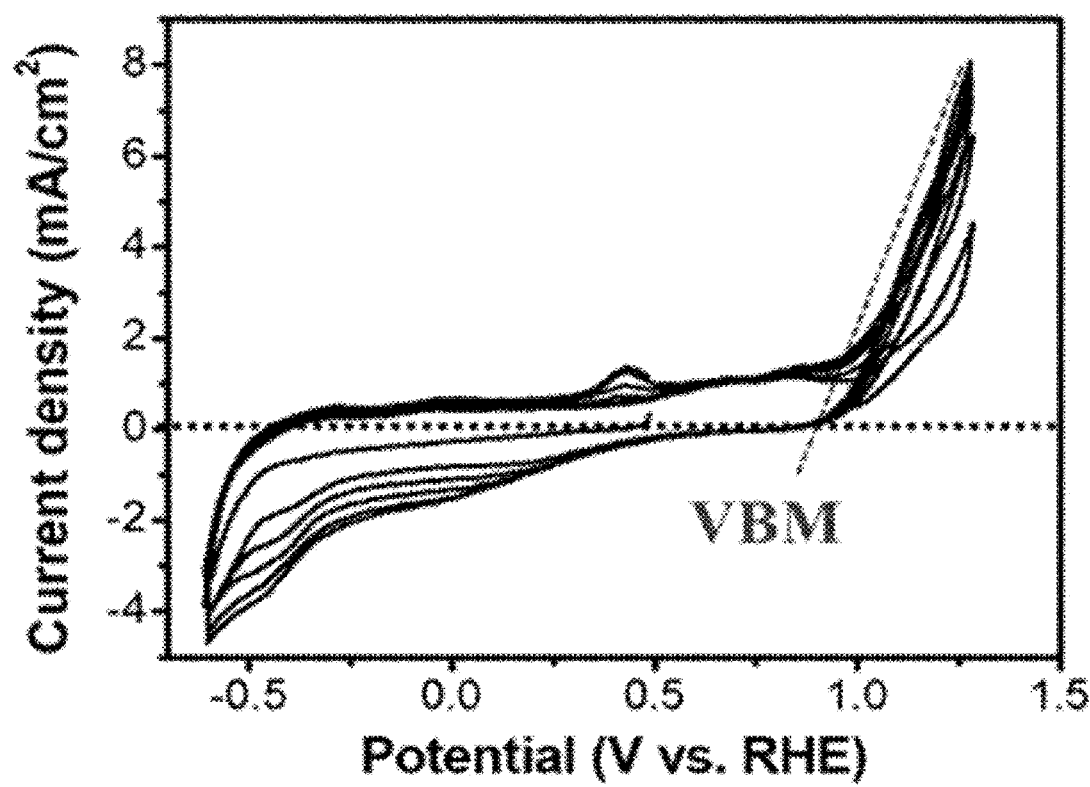

[FIG. 13d]
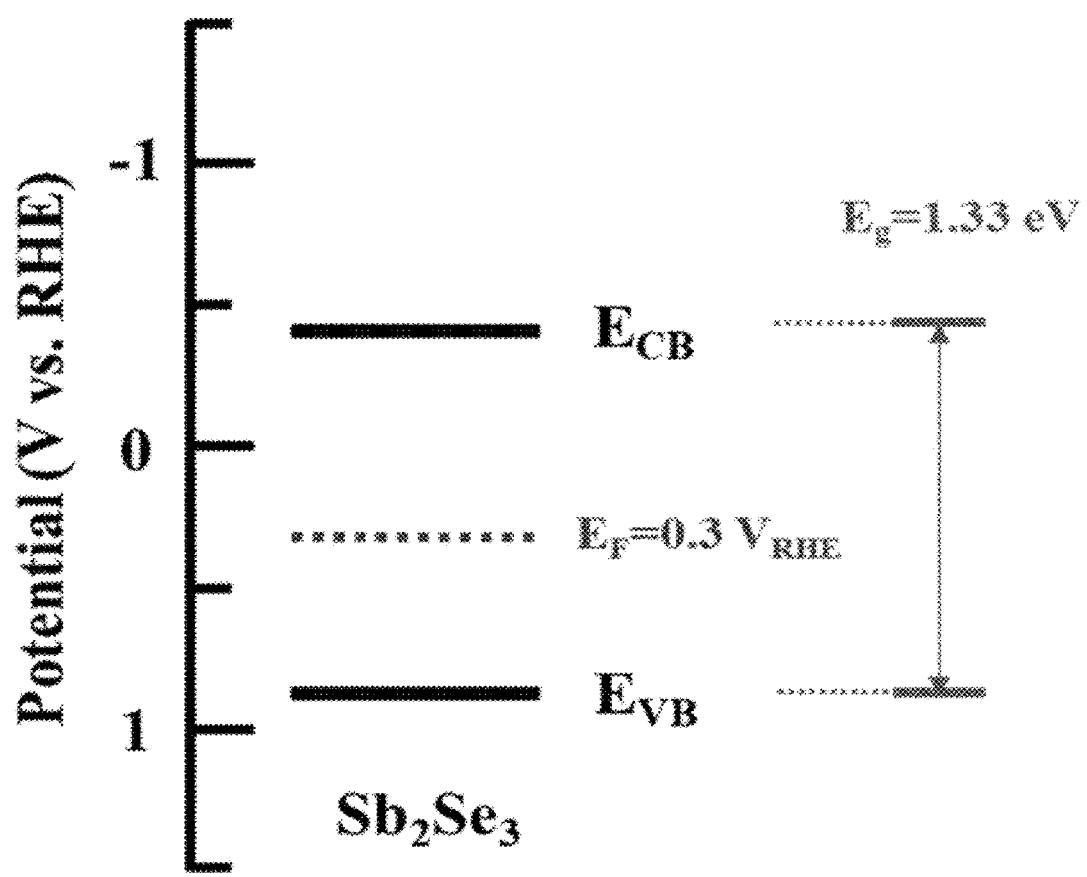

[FIG. 13e]
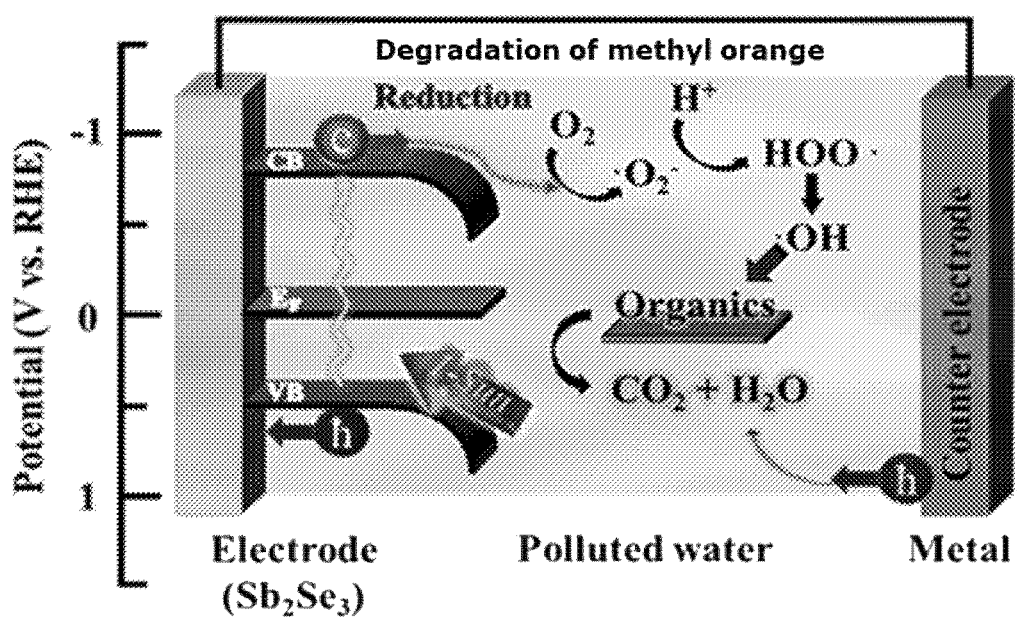

[FIG. 13f]
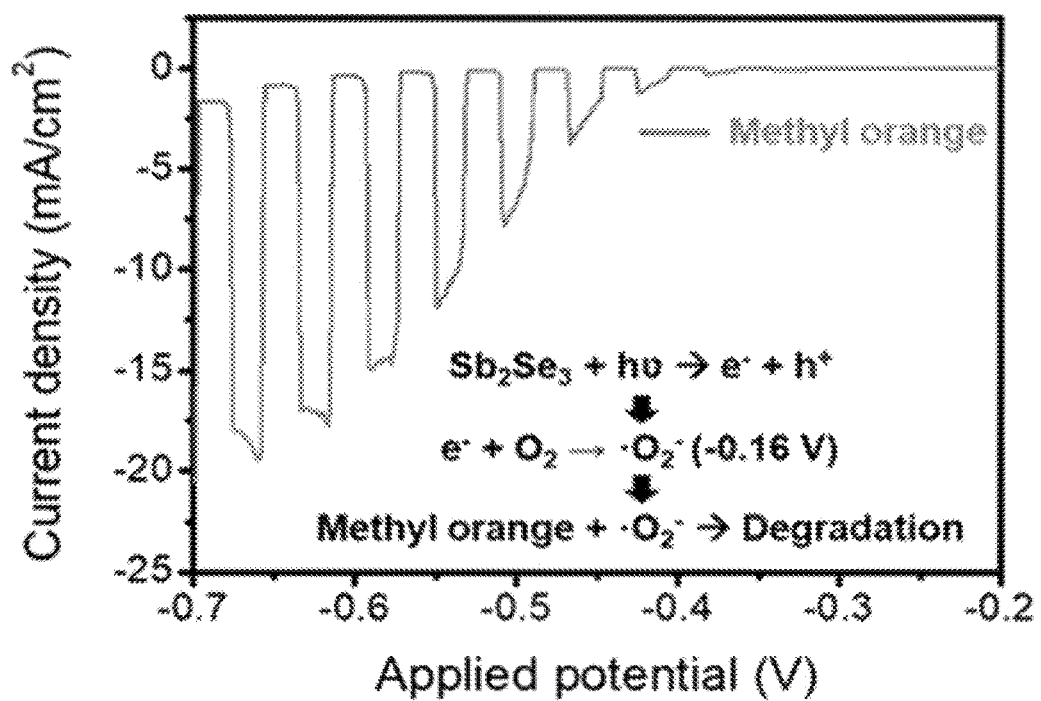

[FIG. 15]
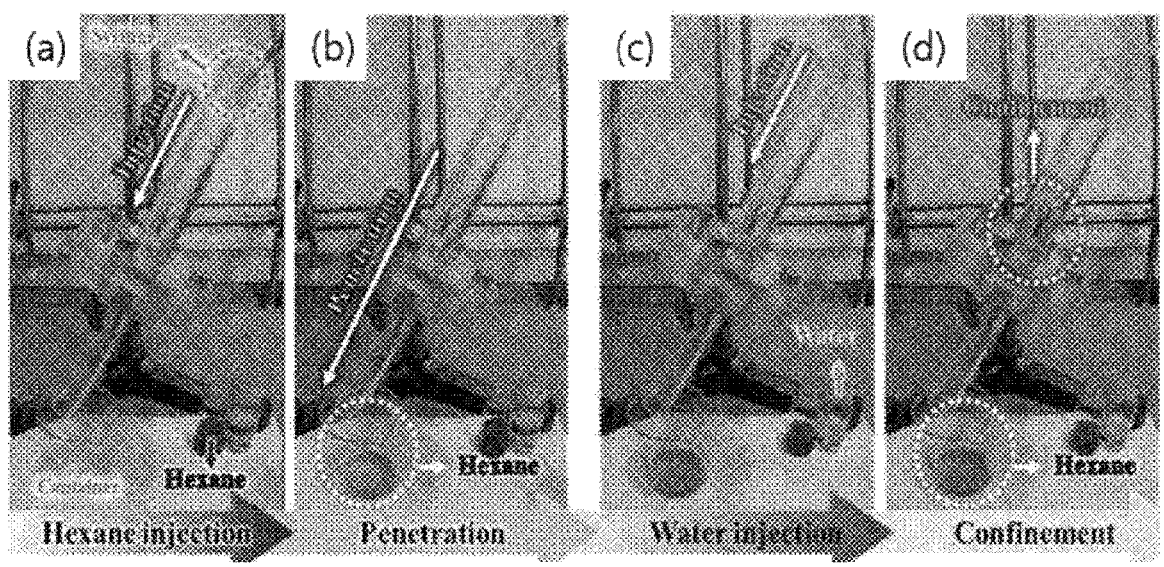

[FIG. 16a]
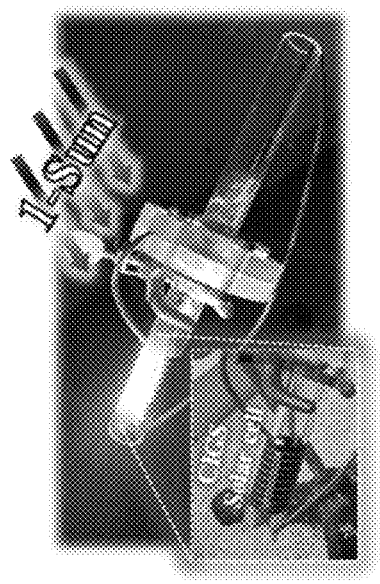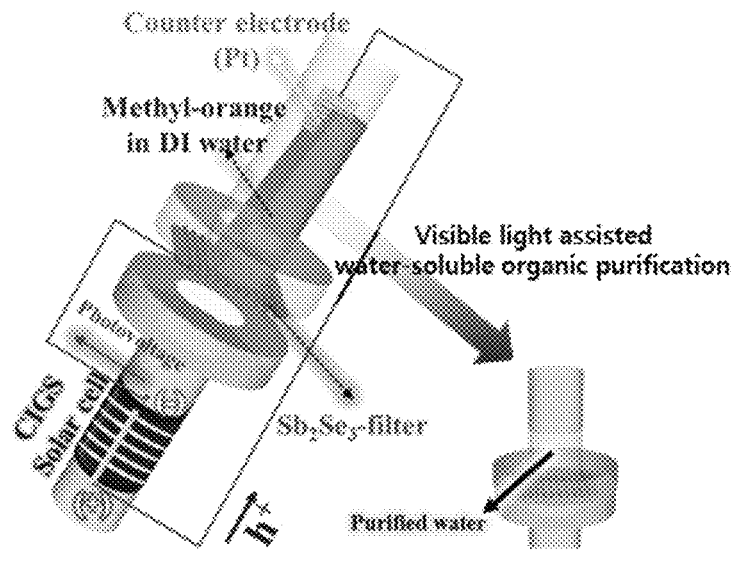

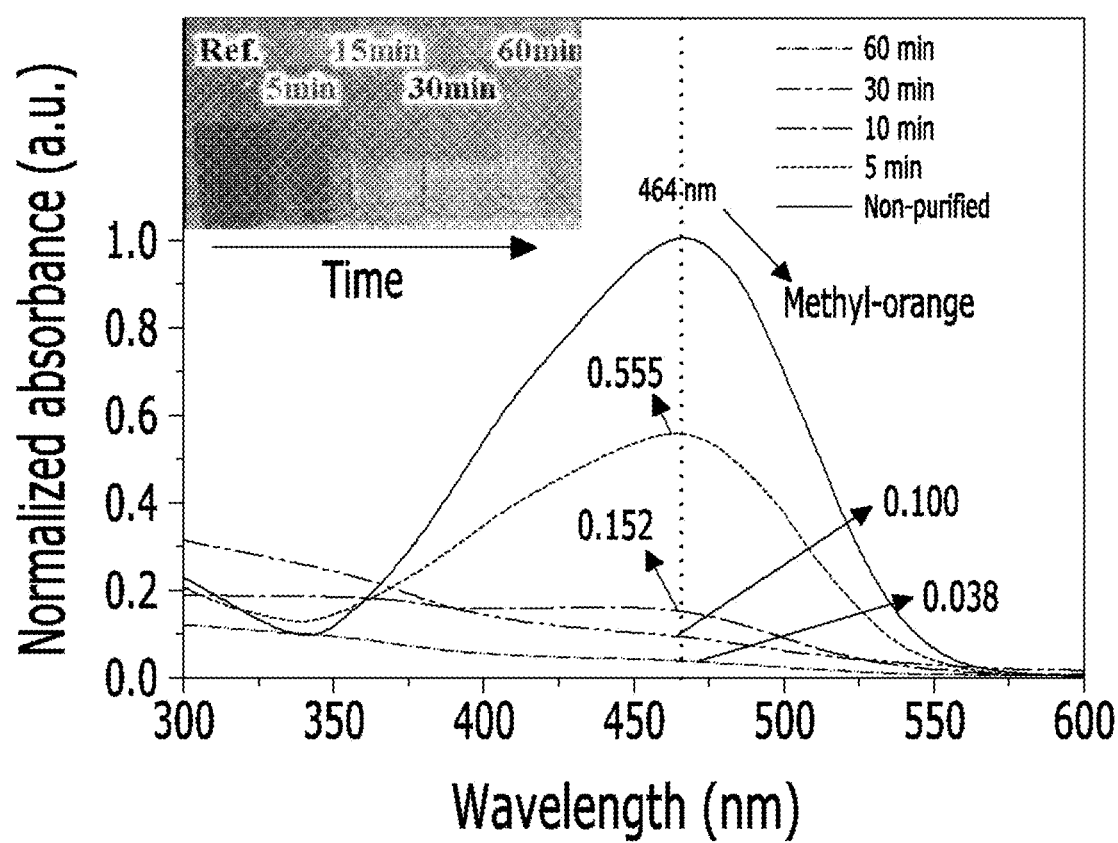
[FIG. 16b]

SEMIPERMEABLE MEMBRANE FOR WATER TREATMENT, PREPARING METHOD FOR THE SAME, AND POLLUTED WATER TREATMENT SYSTEM INCLUDING THE SAME

CROSS-REFERENCE TO RELATED APPLICATIONS

This application claims the priority of Korean Patent Application No. 10-2019-0122819 filed on Oct. 4, 2019, in the Korean Intellectual Property Office, the disclosure of which is incorporated herein by reference.

BACKGROUND

Field

The present disclosure relates to a semipermeable membrane for water treatment, a preparing method for the same, and a polluted water treatment system including the same.

Description of the Related Art

Water is an essential material for life activities and has a solubility which dissolves various materials and an adequate heat capacity to be usefully used for industrial purposes. Even though such water is abundantly present on the earth, since a proportion of fresh water which can be used for life activities is very small in the water on the earth, it is very important to save and use the water.

However, water used in the manufacturing industries includes sludge such as metal debris, oil such as lubricants, and polluted materials such as organic polluted materials, dyes, and various heavy metal ions, and water used in agriculture and livestock industries includes organic materials such as pesticides, fertilizers, and animal excrements. When discharged wastewater is supplied to a water source such as a reservoir, the water of the water source may be contaminated as a whole, and a lot of time and capital are required to purify the polluted water.

Such polluted water may include oil. When the water and oil are left for a long time, oil floats due to a difference in specific gravities between oil and water so that oil and water may be separated through physical separation, which is currently the most widely used method. However, this method has a disadvantage in that it takes a long time to separate oil and water and the oil and the water are not completely separated. Further, there are a method of separating water and oil by increasing the difference in specific gravities by heating oil and a method of separating water and oil by sedimentation using chemical treatment such as reacting a material with water or oil to form a solid material. However, all the above-mentioned methods are physical methods using the difference in specific gravities so that a long time is required to perform the methods, it is difficult to reuse the separated water and oil, and secondary pollution may occur.

Therefore, recently, a technology for separating oil and water using a separation membrane and a filter which use a selective permeability of water and oil and various processes for removing polluted materials included in the water are being studied.

Korean Unexamined Patent Application Publication No. 10-2016-0141066 which is a background of the present application is an early published application by the inventor of the present application and relates to a synthetic method of a nano structure by generating spinodal decomposition using multi-layered precursor. However, the published application discloses only a method of manufacturing a one-dimensional nano structure such as $Sb_2Se_3$, but does not recognize hydrophobicity, hydrophilicity, and photodegradation property of the one-dimensional nano structure.

SUMMARY

An object of the present disclosure is to solve the problems of the related art and to provide a semipermeable membrane for water treatment and a preparing method for the same.

Further, an object of the present disclosure is to provide a polluted water treatment system using the semipermeable membrane for water treatment.

However, objects to be achieved by various embodiments of the present disclosure are not limited to the technical objects as described above and other technical objects may be present.

As a technical means to achieve the above-described technical object, a first aspect of the present disclosure provides a semipermeable membrane for water treatment including a photoactive layer in which the photoactive layer includes a plurality of one-dimensional nano structure bundles and the one-dimensional nano structure is nano-structured so that a surface of the semipermeable membrane for water treatment has a hydrophobicity.

According to an implementation example of the present disclosure, light may be irradiated onto the photoactive layer to allow the photoactive layer to have photodegradation property, but is not limited thereto.

According to an implementation example of the present disclosure, both ends of the one-dimensional nano structure may include a dangling bond and a side surface has hydrophobicity, but is not limited thereto.

According to an implementation example of the present disclosure, the one-dimensional nano structures may be bonded to each other by the Van der Waals force, but it is not limited thereto.

According to an implementation example of the present disclosure, the one-dimensional nano structure may include a $Sb_2X_3$ (X is S, Se, or Te) one-dimensional nano structure, but it is not limited thereto.

According to an implementation example of the present disclosure, the one-dimensional nano structure may include an n-type $Sb_2X_3$ or a p-type $Sb_2X_3$, but it is not limited thereto.

According to an implementation example of the present disclosure, a contact angle of the photoactive layer surface may be 130° or larger, but it is not limited thereto.

Further, a second aspect of the present disclosure provides a preparing method of a semipermeable membrane for water treatment including a step of growing a plurality of one-dimensional nano structures on a first substrate so as to expose side surfaces of the one-dimensional nano structures in which the side surfaces of the one-dimensional nano structures have hydrophobicity.

According to an implementation example of the present disclosure, the method may further include a step of depositing the one-dimensional nano structure on a second substrate by performing a heat treatment on the one-dimensional nano structure and the one-dimensional nano structure is deposited so as to be horizontally rearranged on the second substrate, but it is not limited thereto.

According to an implementation example of the present disclosure, the one-dimensional nano structure may include a $Sb_2X_3$ (X is S, Se, or Te) one-dimensional nano structure, but it is not limited thereto.

According to an implementation example of the present disclosure, the step of depositing of the one-dimensional nano structure may be performed by a process including a method selected from a group consisting of CVD, PVD, electric deposition, ALD, and a combination thereof, but it is not limited thereto.

According to an implementation example of the present disclosure, the first substrate may include a material selected from a group consisting of glass, Mo, $SiO_2$, silicon, silicon carbide, germanium, silicon germanium, InAs, AlAs, GaAs, InP, GaN, InGaAs, InAlAs, GaSb, AlSb, AlP, GaP, ITO, FTO, and a combination thereof, but is not limited thereto.

According to an implementation example of the present disclosure, the second substrate may include a material selected from a group consisting of polyimide, polyethersulfone, polyethylene naphthalate, polyethylene terephthalate, polycarbonate, polyoxymethylene (POM), epoxy, polyphthalamide, polycyclic olefins/polynorbornenes (PCO), polyetheretherketone (PEEK), polyarlyates (PAR), and a combination thereof, but is not limited thereto.

Further, a third aspect of the present disclosure provides a polluted water treatment system using the semipermeable membrane for water treatment according to the first aspect in which the polluted water includes oil and a polluted material, the oil penetrates the semipermeable membrane for water treatment to be removed, and the polluted material is decomposed by the photoactive layer to be removed.

According to an implementation example of the present disclosure, light may be irradiated onto the photoactive layer so that the polluted material may be decomposed by the photoactive layer, but it is not limited thereto.

According to an implementation example of the present disclosure, the polluted water treatment system may further include a power source which applies a voltage to the photoactive layer, but it is not limited thereto.

According to an implementation example of the present disclosure, the power source may include an energy source selected from a group consisting of a solar cell, a piezoelectric device, a thermoelectric device, a magnetic fluid, triboelectricity, a photoelectric device, and a combination thereof, but it is not limited thereto.

The above-described solving means are merely illustrative but should not be construed as limiting the present disclosure. In addition to the above-described embodiments, additional embodiments may be further provided in the drawings and the detailed description of the present disclosure.

The polluted water treatment device of the related art has a complex structure in which a semipermeable membrane for separating oil and the polluted material and a photoactive layer which photodegrades the polluted material are separated.

Specifically, the requirement of a material for the semipermeable membrane which separates insoluble oil and water and the requirement of a material for the photoactive layer which photodegrades the water soluble polluted material did not match. Further, there was no multi-functional material which simultaneously separates the insoluble oil and the water and photodegrades the water soluble polluted material so that the polluted water treatment device of the related art had to have a complex structure.

However, the semipermeable membrane for water treatment according to the present disclosure may photodegrade the polluted material by acting as a photoactive layer by the light while separating the oil and the polluted material. According to the present disclosure, a structure of the polluted water treatment device of the related art is improved and a material which simultaneously serves as the semipermeable membrane and the photoactive layer is developed so that a polluted water treatment device which is developed more than that of the related art may be provided.

Further, the present disclosure provides a semipermeable membrane for water treatment in which a physical process and a chemical process for purifying water are combined as a result of a research of a single material which simultaneously serves as the semipermeable membrane and the photoactive layer. By doing this, the semipermeable membrane for water treatment may simplify the development method of the related art which prepares the polluted water treatment device by individually developing and combining the semipermeable membrane and the photoactive layer.

Further, the voltage is applied to the polluted water treatment device according to the present disclosure so that the polluted water treatment device may photodegrade the polluted material at a higher efficiency.

Further, a multi-component chalcogen material preparing process of the related art has a disadvantage in that it is difficult to elaborately adjust a composition of the multi-component chalcogen material and a process of synthesizing a single phase is complex. However, the preparing method of a semipermeable membrane for water treatment according to the present disclosure may prepare a single phase multi-component chalcogen material with a simple method so that the preparing method may contribute to the preparing method of a multi-component chalcogen material.

Further, the semipermeable membrane for water treatment according to the present disclosure may simultaneously include a p-type semiconductor and an n-type semiconductor depending on the synthesis process. Accordingly, the semipermeable membrane for water treatment not only may decompose the polluted material, but also may be utilized in various areas to suppress the re-bonding of charge-carrier or improve the charge transferring efficiency.

Further, the semipermeable membrane for water treatment may have hydrophobicity and/or hydrophilicity as multi-functions depending on the arrangement direction of the one-dimensional nano structure which is included in the semipermeable membrane for water treatment according to the present disclosure.

However, the effect which can be achieved by the present disclosure is not limited to the above-described effects, there may be other effects.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a diagram for implementing hydrophobicity of a semipermeable membrane for water treatment according to an implementation example of the present disclosure;

FIG. 2 is a diagram of a process of representing a photoactive reaction which is performed after separating oil by a semipermeable membrane for water treatment according to an implementation example of the present disclosure;

FIG. 3 is a diagram of overlapping for arbitrarily implementing multi-functions due to a limited single functionality of a semipermeable membrane for water treatment of the related art;

FIG. 4 is a view of nano structuralization of a material for implementing hydrophobicity of the related art;

FIG. 5 is a view illustrating hydrophobicity for a material of the present disclosure utilized for a semipermeable membrane for water treatment according to an implementation example of the present disclosure;

FIG. 6 is a view illustrating hydrophobicity according to an arrangement direction of a one-dimensional nano structure according to an implementation example of the present disclosure;

FIG. 7 is a view illustrating hydrophobicity according to an arrangement direction of a one-dimensional nano structure according to an implementation example of the present disclosure;

FIG. 8 is a diagram illustrating a preparing method of a semipermeable membrane for water treatment according to an implementation example of the present disclosure;

FIG. 9 is a diagram of a polluted water treatment system according to an implementation example of the present disclosure;

FIGS. 10A to 10C are diagrams and SEM images of a nano structure of a material for a semipermeable membrane for water treatment according to an exemplary embodiment of the present disclosure and a comparative example;

FIG. 11 is an image illustrating a separation performance and method of a semipermeable membrane for water treatment according to an exemplary embodiment of the present disclosure;

FIG. 12A is a TEM observation result and a diffraction pattern of a single nano rod of a one-dimensional nano structure according to an exemplary embodiment of the present disclosure, FIG. 12B is an SEM image and an optical image of a semipermeable membrane for water treatment according to an exemplary embodiment of the present disclosure, and FIG. 12C is an XRD analysis result of a semipermeable membrane for water treatment according to an exemplary embodiment of the present disclosure;

FIG. 13A is a Mott-Schottky graph of a one-dimensional nano structure according to an exemplary embodiment of the present disclosure, FIG. 13B is a measurement result of UV-vis spectroscopy, FIG. 13C is a cyclic voltammetry, FIG. 13D is a Fermi level graph, FIG. 13E is a diagram illustrating a photocatalytic performance of the one-dimensional nano structure, and FIG. 13F is a graph illustrating a catalytic performance of a semipermeable membrane for water treatment according to an exemplary embodiment of the present disclosure;

(a) to (d) of FIG. 15 are photographs illustrating a polluted water treatment system according to an exemplary embodiment of the present disclosure; and FIG. 16A is an actual photograph and a diagram of a polluted water treatment system according to an exemplary embodiment of the present disclosure and FIG. 16B is a graph illustrating an efficiency of a polluted water treatment system.

DETAILED DESCRIPTION OF THE EMBODIMENT

Figure 14:
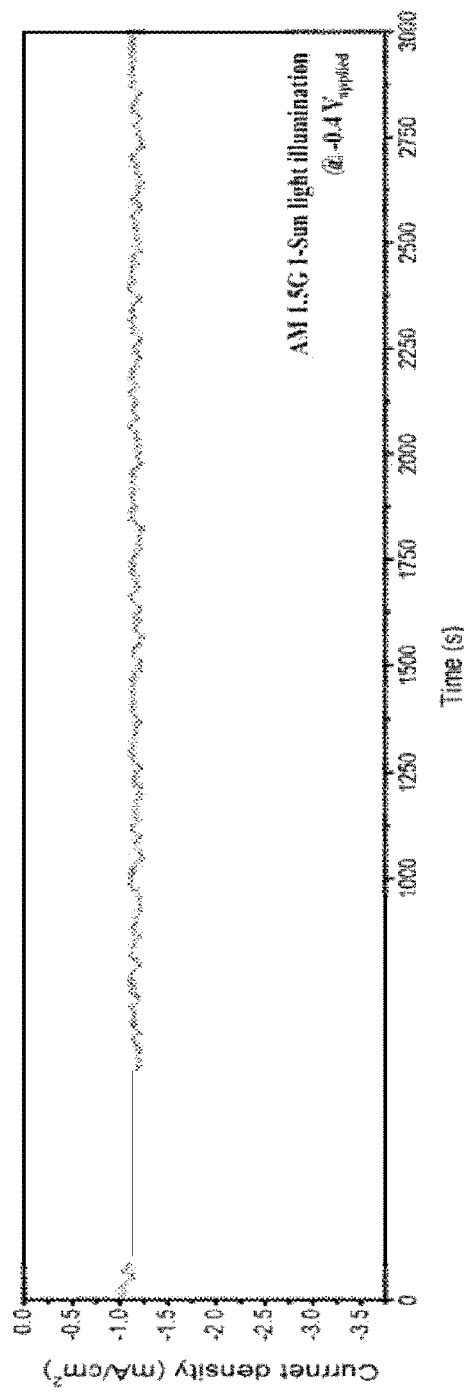
FIG. 14 is a graph of chronoamperometry with respect to a time of a semipermeable membrane for water treatment according to an exemplary embodiment of the present disclosure.

Hereinafter, the present disclosure will be described more fully hereinafter with reference to the accompanying drawings, in which exemplary embodiments of the present disclosure are shown.

However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification of the present disclosure, when it is described that an element is "coupled" to another element, the element may be "directly coupled" to the other element or "electrically coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

The terms "about or approximately" or "substantially" indicating a degree used throughout the specification are used as a numerical value or a meaning close to the numerical value when a unique manufacturing and material tolerance is proposed to the mentioned meaning and also used to prevent unscrupulous infringers from wrongfully using the disclosure in which precise or absolute numerical values are mentioned for better understanding of the present disclosure. Terms used throughout the specification, "~step of ~ing" or "step of~" do not mean "step for~".

Throughout the specification of the present disclosure, the term "combination thereof" included in the expression of Markushi format refers to a mixture or a combination of one or more selected from a group consisting of components described in the expression of the Markushi format and it means that one or more selected from the group consisting of the components is included.

Throughout the specification of the present disclosure, the description of "A and/or B" refers to "A or B" or "A and B".

Throughout the specification of the present disclosure, the description of "vertically growing" includes not only an angle between a growing direction of a material on a substrate and the substrate which is exactly 90°, but also the angle which is approximately 70° to 110°.

Throughout the specification of the present disclosure, the description of "horizontally disposing" includes not only an angle between a growing direction of a material on a substrate and the substrate which is exactly 0°, but also the angle which is approximately 30° or lower.

Throughout the specification of the present disclosure, the description of "polluted material" may include not only a material which generally pollutes water such as excreta, sludge, and dyes, but also a material in which the above-mentioned material is dissolved, for example, water.

Hereinafter, a semipermeable membrane for water treatment, a preparing method thereof, and a polluted water treatment system including the same will be described in detail with reference to implementation examples, exemplary embodiments, and drawings. However, the present disclosure is not limited to the implementation examples, the exemplary embodiments, and the drawings.

FIG. 1 is a diagram for implementing hydrophobicity of a semipermeable membrane 10 for water treatment according to an implementation example of the present disclosure.

As a technical means to achieve the above-described technical object, a first aspect of the present disclosure provides a semipermeable membrane 10 for water treatment including a photoactive layer 100 in which the photoactive layer 100 includes a plurality of one-dimensional nano structure 110 bundles and the one-dimensional nano structure 110 is nano-structured so that a surface of the semipermeable membrane 10 for water treatment has hydrophobicity.

As it will be described below, the semipermeable membrane 10 for water treatment does not include a nano structure in which the one-dimensional nano structure 110 is vertically grown and a surface of the photoactive layer 100 is flat.

Water has good reactivity, dissolves various materials, is used for various purposes such as manufacturing industries and chemical reactions, and is an essential material for life activities. However, the water used for the manufacturing industries and the chemical reaction may include various organic polluted materials and/or inorganic polluted materials so that a purifying process is additionally requested and studies for optimizing the purifying process is actively conducted in the field of industries.

In order to purify various wasted waters, the present disclosure provides a semipermeable membrane 10 for water treatment which separates a polar solvent (water) and non-polar solvent (oil) included in wasted water and photodegrades a polluted material included in the polar solvent, a preparing method thereof, and a polluted water treatment system including the same.

Referring to FIG. 1, the photoactive layer 100 of the semipermeable membrane 10 for water treatment includes the plurality of one-dimensional nano structures 110 and is disposed on a first substrate 200. With regard to this, the one-dimensional nano structures 110 of the photoactive layer 100 may be three-dimensionally randomly disposed on the first substrate 200, and on the surface of the photoactive layer 100, a hydrophilic surface 111 and a hydrophobic surface 112 of the one-dimensional nano structure 110 may co-exist.

According to an implementation example of the present disclosure, the semipermeable membrane 10 for water treatment or the photoactive layer 100 may be formed on the first substrate 200, but are not limited thereto.

On the photoactive layer 100 according to the present disclosure, the one-dimensional nano structures 110 are three-dimensionally randomly disposed and the photoactive layer 100 may simultaneously include the hydrophilic surface 111 and the hydrophobic surface 112 of the one-dimensional nano structure 110. The hydrophobic surface 112 allows the photoactive layer 100 to have hydrophobicity and as it will be described below, the photoactive layer 100 may photodegrade the polluted material 420 by the photodegradation performance of the one-dimensional nano structure 110.

The first substrate 200 according to the present disclosure may refer to any one of a substrate with a round surface, a porous support (not illustrated) including pores of 1 µm to 200 µm, or a substrate with a round surface formed on the porous support and in FIG. 1, as the first substrate 200, only the substrate with a round surface is illustrated.

Even though not illustrated in FIG. 1, the photoactive layer 100 may be provided on the second substrate 300 or a porous support (not illustrated), rather than on the first substrate 200 and may refer to a layer which is not provided on the first substrate 200 and is only formed of a plurality of one-dimensional nano structures 110.

Further, water droplets formed by the hydrophobic surface 112 of the one-dimensional nano structure 110 or water droplets provided on the surface of the photoactive layer 100 and the semipermeable membrane 10 for water treatment may include moisture selected from a group consisting of the polluted water 400, the polluted material 420, a purified water 500, and a combination thereof.

With regard to this, the semipermeable membrane 10 for water treatment may separate the oil 410 and the polluted material 420 using the hydrophobicity of the photoactive layer 100 without using the first substrate 200 and also photodegrade the polluted material 420, but is not limited thereto.

The one-dimensional nano structure according to the present disclosure refers to a nano material having a one-dimensional structure. As it will be described below, the photoactive layer 100 may have hydrophobicity and/or hydrophilicity depending on the surface of the one-dimensional nano structure 110.

As it will be described below, the semipermeable membrane 10 for water treatment or the photoactive layer 100 does not allow the polluted material 420 to penetrate, but allows the oil 410 to penetrate, so that the polluted material 420 and the oil 410 are separated. With regard to this, the polluted material 420 may exist on the surface of the semipermeable membrane 10 for water treatment or the photoactive layer 100 according to the nano structure and the hydrophobicity of the one-dimensional nano structure 110 and porous pores may be required to allow the oil 410 to penetrate.

The photoactive layer 100 of the semipermeable membrane for water treatment has semipermeability to separate the polluted material 420 including a pollutant and an organic solvent and the oil 410 and receives light to photodegrade the polluted material 420.

According to an implementation example of the present disclosure, the light is irradiated to allow the photoactive layer 100 to have photodegradation property, but it is not limited thereto.

FIG. 2 is a diagram of a process of representing a photoactive reaction which is performed after separating oil by a semipermeable membrane 10 for water treatment according to an implementation example of the present disclosure and FIG. 3 is a diagram of overlapping for arbitrarily implementing multi-functions due to a limited single functionality of the semipermeable membrane for water treatment of the related art.

Referring to FIG. 2, if the polluted material 420 and the oil 410 are dropped on the photoactive layer 100 of the semipermeable membrane 10 for water treatment, the oil 410 penetrates the photoactive layer 100 and the polluted material 420 is bounced to be photodegraded by the photoactive layer 100 and the light to form the purified water 500.

However, referring to FIG. 3, the semipermeable membrane for water treatment of the related art has a structure in which a membrane including a hydrophobic material which separates the oil 410 and the polluted material 420 and a photoactive material which photodegrades the polluted material 420 are separated so that the structure may be more complex than that of the semipermeable membrane 10 for water treatment according to the present disclosure.

According to an implementation example of the present disclosure, the one-dimensional nano structure 110 on the photoactive layer 100 may be nano-structured, but is not limited thereto.

FIG. 4 is a view of nano structuralization of a material for implementing hydrophobicity of the related art.

A Cassie-Baxter effect may be derived by the nano-structurization. The Cassie-Baxter effect refers to an effect that the water droplet has a large contact angle in a complex state with a large fraction of gas in which the water droplets float on the surface of the nano structure without being smeared.

Generally, as the material is nano-structured, the material may have hydrophobicity by the Cassie-Baxter effect. However, as illustrated in FIG. 2, a material from which the water droplets may bounce is limited. The water droplet bouncing phenomenon may be generated from a material greatly having a high super-hydrophobicity due to a combination of the Cassie-Baxter effect, the hydrophobicity caused by the crystal structure, surface treatment which causes the hydrophobicity, and other various factors.

Referring to FIGS. 4 and 5, when the material of the related art which has a hydrophilic surface is nano-structured, an air cavity is generated by the Cassie-Baxter effect to allow the material to have a hydrophobicity. With regard to this, when the one-dimensional nano structure 110 is vertically disposed, the generation of the air cavity is minimized so that the photoactive layer 100 may have a hydrophilic surface.

However, when the structure of the photoactive layer 100 includes a nano structure in which the one-dimensional nano structure 110 does not vertically grow, the photoactive layer 100 may have hydrophobicity due to the one-dimensional nano structure 110. With regard to this, when the air cavities are sufficiently generated on the surface of the photoactive layer 100 due to the one-dimensional nano structure 110, the hydrophobicity of the photoactive layer 100 is improved by the Cassie-Baxter effect so that the water does not penetrate the semipermeable membrane 10 for water treatment or the photoactive layer 100.

According to an implementation example of the present disclosure, a contact angle of the surface of the photoactive layer 100 may be 130° or larger, but it is not limited thereto.

The contact angle according to the present disclosure is an angle formed by the liquid droplet and a surface of a solid material at an interface of phases where the solid, a liquid (liquid droplet), and gas intersect when there are water droplets on the surface of the solid material and is expressed by $\theta_c$. The contact angle may be determined by an interfacial tension $\gamma_{SL}$, between the solid and the liquid, an interfacial tension $\gamma_{SG}$ between the solid and the gas, and an interfacial tension $\gamma_{LG}$ between the liquid and the gas and three interfacial tensions and the contact angle may form the relationship represented by the following Equation 1.

$$\gamma_{SG} = \gamma_{SG} + \gamma_{SG} \times \cos(\theta_c)$$ [Equation 1]

Generally, a material having a contact angle with respect to water which is smaller than 90° is referred to as a hydrophilic material and a material having a contact angle which exceeds 90° is referred to as a hydrophobic material. With regard to this, a material having a contact angle with respect to the water which is 150° is referred to as a superhydrophonic material and the superhydrophobicity is also analyzed as a property which pushes water so that the superhydrophobicity is also referred to as water repellency.

As described above, the photoactive layer 100 according to the present disclosure includes a hydrophilic surface 111 and a hydrophobic surface 112 of the one-dimensional nano structure 110 which is three-dimensionally randomly disposed so that the photoactive layer 100 may have both the hydrophilicity and the hydrophobicity.

According to an implementation example, both ends of the one-dimensional nano structure 110 have a dangling bond and a side surface has hydrophobicity, but are not limited thereto.

According to an implementation example, the one-dimensional nano structures 110 may be bonded to each other by the Van der Waals force, but are not limited thereto.

The dangling bond according to the present disclosure which is a kind of surface defects refers to a part where the bonding of atoms is disconnected. Specifically, atoms on a crystal surface or a bonding site in the crystal may exist in a state where some bonds are disconnected due to coordinative unsaturation, unlike atoms within the perfect crystal, and the dangling bond refers to the broken bond. When an atom or molecule approaches the dangling bond, it may easily form a chemical bond.

Since the both ends of the one-dimensional nano structure 110 include the dangling bond, the both ends may have a property which is easily bonded with the water, that is, hydrophilicity. However, a surface other than the both ends of the one-dimensional nano structure 110, that is, the side surface does not include the dangling bond, so that the side surface is not bonded with the water. Therefore, the side surface may have a hydrophobicity.

With regard to this, the side surface of the one-dimensional nano structure 110 may be bonded with a side surface of another one-dimensional nano structure 110 by the Van der Waals force, rather than by the dangling bond. The Van der Waals force is a very weak bond as compared with an ionic bond, a metal bond, or a covalent bond, so that the separation may be easily caused. Accordingly, the photoactive layer 100 may include one-dimensional nano structure 110 bundles with a very small thickness.

FIG. 5 is a view illustrating hydrophobicity of a semipermeable membrane 10 for water treatment according to an implementation example of the present disclosure.

Referring to FIG. 5, a property of the surface of the photoactive layer 100 may vary depending on an inclination angle of the one-dimensional nano structure 110 formed on the first substrate 200. For example, the photoactive layer having the one-dimensional nano structure 110 which is grown to be almost vertical to the first substrate 200 may have a contact angle with the water of 30° and have hydrophilicity. In contrast, the photoactive layer 100 having the one-dimensional nano structure 110 which is grown to be almost horizontal to the first substrate 200 or randomly disposed may have a contact angle with the water of 150° or larger and have superhydrophilicity.

With regard to this, when water droplets are dropped on the photoactive layer 100, the water droplets are scattered into smaller water droplets due to impact, but the water droplets are aggregated due to the above-mentioned superhydrophobicity. As a result, the water droplets may bounce on the photoactive layer 100 or exist on the surface of the photoactive layer 100.

According to an implementation example of the present disclosure, the one-dimensional nano structure 110 may include a one-dimensional nano structure of $Sb_2X_3$ (X is S, Se, or Te), but is not limited thereto.

According to an implementation example of the present disclosure, the one-dimensional nano structure 110 may include n-type $Sb_2X_3$ or p-type $Sb_2X_3$, but is not limited thereto.

Desirably, the one-dimensional nano structure 110 may include n-type $Sb_2Se_3$ or p-type $Sb_2Se_3$, but is not limited thereto.

As it will be described below, the one-dimensional nano structures 110 may be formed with the same composition and different semiconductor types according to the preparing method.

FIGS. 6 and 7 are views illustrating hydrophobicity according to an arrangement direction of a one-dimensional nano structure 110 according to an implementation example of the present disclosure.

Referring to FIG. 6, in the case of a photoactive layer in which a (0k0) plane of $Sb_2Se_3$ one-dimensional nano structure 110 is disposed on a surface, a dangling bond of the (0k0) plane allows $Sb_2Se_3$ to have hydrophilicity. In contrast, in the case of the photoactive layer 100 in which a (h01) plane or (h00) plane of $Sb_2Se_3$ is disposed on the surface, the surface of the photoactive layer does not include the dangling bond, so that the surface has hydrophobicity.

Referring to FIG. 7, it is confirmed that the more the one-dimensional nano structure 110 is disposed to be horizontal to the first substrate 200, the stronger the hydrophobicity.

A second aspect of the present disclosure provides a preparing method of a semipermeable membrane 10 for water treatment which includes a step of growing a plurality of one-dimensional nano structures 110 on a first substrate 200 so as to expose side surfaces of the one-dimensional nano structures 110 and the side surfaces of the one-dimensional nano structures 110 have hydrophobicity.

A detailed description of repeated parts of the preparing method of a semipermeable membrane 10 for water treatment according to the second aspect of the present disclosure with the first aspect of the present disclosure will be omitted. However, even though the detailed description thereof is omitted, the description of the first aspect of the present disclosure may be applied to the second aspect of the present disclosure in the same manner.

FIG. 8 is a diagram illustrating a preparing method of a semipermeable membrane 10 for water treatment according to an implementation example of the present disclosure.

Referring to FIG. 8, the one-dimensional nano structure 110 included in the photoactive layer 100 formed on the first substrate 200 is moved onto the second substrate 300 by the heat to be rearranged.

According to an implementation example, the step of growing the one-dimensional nano structure 110 on the first substrate 200 may include a step of depositing a first precursor (not illustrated) on the first substrate, a step of depositing a second precursor on the deposited first precursor, and a step of performing a heat treatment on the first precursor and the second precursor, but is not limited thereto.

For example, when the one-dimensional nano structure 110 is $Sb_2Se_3$, Sb is deposited on the first substrate 200 and Se is deposited on the Sb, and then the heat treatment is performed on the Sb—Se material to form $Sb_2Se_3$.

According to an implementation example, the depositing step may be performed by a process including a method selected from a group consisting of electric deposition, PVD, CVD, ALD, and a combination thereof, but is not limited thereto.

A time required in the heat-treatment step and a composition of the second precursor are adjusted so that n-type and p-type one-dimensional nano structures 110 may coexist and one-dimensional nano structures 110 may also be formed to have a single crystal structure or a polycrystalline structure.

For example, during the process of synthesizing the $Sb_2Se_3$ one-dimensional nano structure 110, an amount of Se gas is adjusted so that p-type and n-type $Sb_2Se_3$ may coexist.

Specifically, in order to synthesize $Sb_2Se_3$, when Se is deposited on Sb and a temperature is raised, Se may be excessively lost due to a low melting point of Se. Even though the Sb reacts with Se to form $Sb_2Se_3$, there may be a p-type Sb—Se defect on the $Sb_2Se_3$ due to the excessive loss of Se. When the heat treatment is performed on $Sb_2Se_3$ with the p-type Sb—Se defect without moving a chamber, the inside of the chamber becomes an atmosphere with abundant Se during the process in which the Se is excessively lost so that the one-dimensional nano structure 110 may include an n-type $Sb_2Se_3$ one-dimensional nano structure 110 including a p-type Sb—Se defect.

As the heat treatment time of the $Sb_2Se_3$ is shorter, a sufficient time to recrystallize the $Sb_2Se_3$ is not ensured so that the $Sb_2Se_3$ may have a polycrystalline structure.

According to an implementation example of the present disclosure, a step of depositing the one-dimensional nano structure 110 on a second substrate 300 by performing the heat treatment on the one-dimensional nano structure 110 which is grown on the first substrate 200 is further included and the one-dimensional nano structure 110 is deposited to be horizontally rearranged on the second substrate 300, but is not limited thereto. Desirably, the photoactive layer 100 including the one-dimensional nano structure 110 which is horizontally rearranged may include a hydrophobic surface 112, or a hydrophilic surface 111 and a hydrophobic surface 112 of the one-dimensional nano structure 110.

With regard to this, during a step of evaporating the one-dimensional nano structure 110 to be transferred onto the second substrate 300, the one-dimensional nano structure 110 material itself may be maintained. However, the bonding structure of the one-dimensional nano structure 110 is modified due to the deposition so that the bonding structure of the one-dimensional nano structure 110 on the second substrate 300 may be different from the bonding structure of the one-dimensional nano structure 110 on the first substrate 200.

According to an implementation example of the present disclosure, the semipermeable membrane 10 for water treatment may include the photoactive layer 100 which is peeled off from the first substrate 200 or the second substrate 300 and includes the one-dimensional nano structure 110, but is not limited thereto.

As described in detail above, when the one-dimensional nano structure 110 is vertically grown on the first substrate 200, the photoactive layer 100 including the one-dimensional nano structure 110 may not have hydrophobicity. In order to solve the problems caused by the vertical growth, a step of depositing the one-dimensional nano structure 110 on the second substrate 300 may be further included.

Generally, a process of forming the photoactive layer 100 including the one-dimensional nano structure 110 may be performed on the first substrate 200 which is a soft material. When there is a necessity to bend the semipermeable membrane for water treatment, the photoactive layer 100 formed on the first substrate 200 may be deposited or transferred onto the second substrate 300.

According to an implementation example of the present disclosure, the one-dimensional nano structure 110 may include a one-dimensional nano structure of $Sb_2X_3$ (X is S, Se, or Te), but is not limited thereto.

According to an implementation example of the present disclosure, the first substrate 200 may include a material selected from a group consisting of glass, Mo, $SiO_2$, silicon, silicon carbide, germanium, silicon germanium, InAs, AlAs, GaAs, InP, GaN, InGaAs, InAlAs, GaSb, AlSb, AlP, GaP, ITO, FTO, and a combination thereof, but is not limited thereto.

According to an implementation example of the present disclosure, the second substrate 300 may include a material selected from a group consisting of polyimide, polyethersulfone, polyethylene naphthalate, polyethylene terephthalate, polycarbonate, polyoxymethylene (POM), epoxy, polyphthalamide, polycyclic olefins/polynorbornenes (PCO), polyetheretherketone (PEEK), polyarlyates (PAR), and a combination thereof, but is not limited thereto.

According to an implementation example of the present disclosure, the first substrate 200 and the second substrate 300 may have a shape selected from a group consisting of a circle, a cylinder, a polygon, a polygonal column, a column including an atypical surface, and a combination thereof, but is not limited thereto.

According to an implementation example of the present disclosure, the first substrate 200 and the second substrate 300 may further include a mesh type third substrate (not illustrated) including a hydrophobic material, but is not limited thereto. For example, the third substrate may include a Pt mesh.

According to an implementation example of the present disclosure, the first substrate 200 and the second substrate 300 may include a porous support (not illustrated) including pores of 1 μm to 200 μm, but is not limited thereto.

For example, the semipermeable membrane 10 for water treatment is formed by forming the one-dimensional nano structure 110 on the mesh type first substrate 200 with a round surface and then transferring the one-dimensional nano structure 110 onto the second substrate 300 or formed by disposing the one-dimensional nano structure 110 and the first substrate 200 on the second substrate 300.

The semipermeable membrane 10 for water treatment limits the penetration of the polluted material 420 to selectively separate the oil 410 and the polluted material 420. The polluted material 420 may exist on the semipermeable membrane 10 for water treatment, the photoactive layer 100, the first substrate 200, or the second substrate 300 by the hydrophobicity or superhydrophobicity of the photoactive layer 100, but the oil 410 needs to penetrate the semipermeable membrane 10 for water treatment.

As described in detail above, the polluted material 420 is separated from the oil 410 due to the hydrophobicity of the photoactive layer 100 and also may be photodegraded by the photodegradation performance of the photoactive layer 100. Further, the first substrate 200 and/or the second substrate 300 on which the semipermeable membrane 10 for water treatment is formed may include a porous support to ensure a permeation path of the oil 410.

A third aspect of the present disclosure provides a polluted water treatment system (not illustrated) using the semipermeable membrane 10 for water treatment according to the first aspect in which the polluted water 400 includes oil 410 and a polluted material 420, the oil 410 permeates the semipermeable membrane 10 for water treatment to be removed and the polluted material 420 is decomposed by the photoactive layer 100 to be removed.

A detailed description of repeated parts of the polluted water treatment system according to the third aspect of the present disclosure with the first aspect and the second aspect of the present disclosure will be omitted. However, even though the detailed description thereof is omitted, the description of the first aspect and the second aspect of the present disclosure may be applied to the third aspect of the present disclosure in the same manner.

FIG. 9 is a diagram of a polluted water treatment system according to an implementation example of the present disclosure.

Referring to FIG. 9, the polluted water treatment system may include a purifying device including an injecting unit (not illustrated) through which the oil 410 and the polluted material 420 are injected, the semipermeable membrane for water treatment according to the first aspect of the present disclosure, and a reservoir (not illustrated) which stores the oil 410.

According to an implementation example of the present disclosure, light is irradiated onto the photoactive layer 100 so that the polluted material 420 may be decomposed by the photoactive layer 100, but is not limited thereto.

According to an implementation example of the present disclosure, a wavelength of the light irradiated onto the photoactive layer 100 may be 200 nm to 800 nm, but is not limited thereto. The range of the wavelength of the light may vary depending on a kind of the polluted material 420.

The polluted water 400 according to the present disclosure includes the oil 410 and the polluted material 420. The oil 410 and the polluted material 420 of the polluted water 400 may be separated by the semipermeable membrane 10 for water treatment and a water component of the polluted water 400 may exist in the same area as the polluted material 420.

The oil 410 according to the present disclosure refers to a non-polar solvent which is not mixed with the polluted material 420. For example, the oil 410 may include a non-polar solvent selected from a group consisting of hexane, diiodomethane, benzene, chloroform, diethyl ether, diisopropyl ether, 1,4-dioxane, and a combination thereof, but is not limited thereto.

The polluted material 420 according to the present disclosure may include factory wastewater, agricultural wastewater, household wastewater, or livestock wastewater in which organic dyes such as methyl orange, methylene blue, Rhodamine B, or brilliant green or a pollutant such as $OCN^-$, dichromate, $Hg^{2+}$, $Co^{2+}$, $Cu^{2+}$, dichloromethane, tetrachloroethylene, 1,2-dibromo-3-chloropropane, trichloroethylene, $CCl_3CH(OH)_2$, $CH_3Cl$, $CHBr_3$, $CCl_4$, $CCl_3COO^-$, chlorobenzoic acid, detergents, excrement, pesticides, or fertilizers are included on a polar solvent represented by water, but is not limited thereto.

With regard to this, when the oil 410 is hexane and the polluted material 420 includes water, since hexane and water are colorless materials, it may be difficult to distinguish a material which penetrates the semipermeable membrane 10 for water treatment. In order to solve the problems, the oil 410 may further include a dye such as oil-blue A, and the polluted material 420 may further include a dye such as methyl orange.

According to an implementation example of the present disclosure, the polluted material 420 may be decomposed by the light irradiated and a voltage applied, to the photoactive layer 100, but is not limited thereto.

Specifically, when the polluted water 400 is injected into the purifying device, the oil 410 may be separated from the polluted material 420 due to the semipermeability of the photoactive layer 100. The oil 410 penetrates to a lower end of the purifying device and the polluted material 420 may exist on the surface or bounce from the surface due to the hydrophobicity of the photoactive layer 100.

At this time, when a voltage is applied to the photoactive layer 100, electrons are supplied to a p-type semiconductor part of the one-dimensional nano structure 110 on the photoactive layer 100 and holes are supplied to an n-type semiconductor part thereof and the electrons and holes may be excited by the irradiated light. The excited electrons and holes decompose the pollutant of the polluted material 420 to purify the polluted material 420.

According to an implementation example of the present disclosure, a power source (not illustrated) which applies a voltage to the photoactive layer 100 may be further included, but it is not limited thereto.

According to an implementation example of the present disclosure, the power source may include an energy source selected from a group consisting of a solar cell, a piezoelectric device, a thermoelectric device, a magnetic fluid, a triboelectricity, a photoelectric device, and a combination thereof, but is not limited thereto.

Hereinafter, the present disclosure will be described in more detail with respect to examples, but the following examples are set forth to illustrate, but are not to be construed to limit the scope of the present disclosure.

Example 1

Sb was deposited on a Mo/glass substrate and Se was vacuum-deposited on the Sb at a room temperature. After depositing Se to have a predetermined thickness or larger, heat treatment was performed for one hour at 300° C. to form a photoactive layer including $Sb_2Se_3$, and heat treatment was additionally performed for one hour to four hours at 300° C. to allow the photoactive layer to have n-type or p-type electrical conductivity.

Next, in order to separate and move the photoactive layer from the Mo/glass substrate, a mesh type Pt support was disposed on the photoactive layer and was subjected to vacuum heat treatment at 350° C. to form a nano-structured photoactive layer on the mesh support, thereby obtaining a semipermeable membrane for water treatment.

With regard to this, $Sb_2Se_3$ was three-dimensionally and randomly grown.

Example 2

The same process as Example 1 was performed. After depositing the photoactive layer existing on the Mo/glass substrate or the Pt support on a polyimide substrate, additional heat treatment was performed to allow the photoactive layer to have an n-type or p-type electrical conductivity.

With regard to this, $Sb_2Se_3$ was horizontally disposed on the mesh support or the substrate.

Comparative Example 1

The same process as Example 1 was performed, but $Sb_2Se_3$ was vertically grown on the glass substrate.

FIGS. 10A to 10C are diagrams and SEM images of a nano structure of a material for a semipermeable membrane for water treatment according to an exemplary embodiment of the present disclosure and a comparative example.

Referring to FIG. 10, it was confirmed that as the $Sb_2Se_3$ nanorod was vertically disposed to the substrate, a hydrophobic surface of $Sb_2Se_3$ existed on a surface of the mesh support.

FIG. 11 is an image illustrating a separating method of a semipermeable membrane for water treatment according to an exemplary embodiment of the present disclosure.

Referring to FIG. 11, when oil including hexane and oil-blue and water including methyl orange were dropped on the semipermeable membrane for water treatment, it was confirmed that the water rebounded from a surface of the semipermeable membrane for water treatment, but oil penetrated the semipermeable membrane for water treatment.

Experimental Example 1

FIG. 12A is a TEM observation result and a diffraction pattern of a single nano rod of a one-dimensional nano structure according to an exemplary embodiment of the present disclosure, FIG. 12B is an SEM image and an optical image of a semipermeable membrane for water treatment according to an exemplary embodiment of the present disclosure, and FIG. 12C is an XRD analysis result of a semipermeable membrane for water treatment according to an exemplary embodiment of the present disclosure.

Referring to FIG. 12, it was confirmed that $Sb_2Se_3$ was grown in a [010] direction, a $Sb_2Se_3$/Pt mesh had a pore of approximately 100 and $Sb_2Se_3$ with crystallinity was three-dimensionally randomly arranged.

FIG. 13A is a Mott-Schottky graph of a one-dimensional nano structure according to an exemplary embodiment of the present disclosure, FIG. 13B is a measurement result of UV-vis spectroscopy, FIG. 13C is a cyclic voltammetry, FIG. 13D is a Fermi level graph, FIG. 13E is a diagram illustrating a photocatalytic performance of the one-dimensional nano structure, FIG. 13F is a graph illustrating a catalytic performance of a semipermeable membrane for water treatment according to an exemplary embodiment of the present disclosure, and FIG. 14 is a graph of chronoamperometry with respect to a time of a semipermeable membrane for water treatment according to an exemplary embodiment of the present disclosure.

Referring to FIGS. 13A to 13C, the one-dimensional nano structure exhibits a semiconductor characteristic showing a p-type electrical conductivity and the Fermi level is located at approximately 0.3 V vs. RHE. Through the optical analysis, a band gap is approximately 1.33 eV and a constant pattern is shown under a cyclic voltage-current condition so that the stability may be confirmed.

Referring to FIGS. 13D to 13F and FIG. 14, a diagram summarizes the energy band structure in an equilibrium state of the $Sb_2Se_3$ one-dimensional nano structure and a diagram illustrates that when a voltage is applied to the $Sb_2Se_3$, a surface energy band is wrapped in the equilibrium energy band structure. The $Sb_2Se_3$ one-dimensional nano structure may reduce $O_2$ distributed in the polluted water to $O_2^-$ due to a driving force of the energy band wrap and the generated photo charges. The $O_2^-$ reacts with an organic material of the polluted water, for example, methyl orange to decompose the methyl orange. Further, some of the photo charges generated by the process of reacting $O_2^-$ with methyl orange or the irradiation of light may directly decompose the methyl orange.

With regard to this, the frequency of the degradation may be confirmed by a current density and when light is irradiated in an environment where the degradation is performed, it is confirmed that the decomposition is more actively performed.

Experimental Example 2

(a) to (d) of FIG. 15 are photographs illustrating a polluted water treatment system according to an exemplary embodiment of the present disclosure and FIG. 16A is an actual photograph and a diagram of a polluted water treatment system according to an exemplary embodiment of the present disclosure and FIG. 16B is a graph illustrating an efficiency of a polluted water treatment system.

Referring to FIG. 15, the hexane injected into the polluted water treatment system (a) penetrates a semipermeable membrane for water treatment of the polluted water treatment system (b) and the polluted water injected into the polluted water treatment system (c) is purified (confinement) (d) while existing above the semipermeable membrane for water treatment of the polluted water treatment system.

Referring to FIG. 16, the polluted water treatment system may purify the methyl-orange in DI water using light energy and electric energy of a solar cell and light with a wavelength of 350 nm to 550 nm, specifically, light with a wavelength of 464 nm is irradiated for approximately one hour to purify the methyl-orange in DI water.

The above-description of the present disclosure is illustrative only and it is understood by those skilled in the art that the present disclosure may be easily modified to another specific type without changing the technical spirit of an essential feature of the present disclosure. Thus, it is to be appreciated that embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A semipermeable membrane for water treatment, comprising:
   a photoactive layer that comprises a photoactive layer surface on which nanorods comprising $Sb_2X_3$, where X is S, Se, or Te, are disposed,
   wherein the nanorods are three-dimensionally randomly disposed on the photoactive layer surface,
   wherein a plurality of the nanorods is horizontally disposed on the photoactive layer surface to expose a hydrophobic side of the nanorods,
   wherein a plurality of the nanorods is vertically disposed on the photoactive layer surface to expose an end of the nanorods having a dangling bond,
   wherein the nanorods are oriented on the photoactive layer surface to form a nanostructure accommodating an air cavity between the nanorods to form a hydrophobic surface by the Cassie-Baxter effect that is permeable to a nonpolar solvent but impermeable to a polar solvent,
   wherein the nanorods are horizontally disposed to expose a (h00) plane, a (h01) plane, or a combination thereof; and
   the photoactive layer is configured to photodegrade a polluted material upon being irradiated by light.

2. The semipermeable membrane for water treatment according to claim 1, wherein a side surface of the nanorods is hydrophobic, and both ends of the nanorods comprise a dangling bond.

3. The semipermeable membrane for water treatment according to claim 1, wherein the nanorods comprise one-dimensional nano structures that are bonded to each other by Van der Waals force.

4. The semipermeable membrane for water treatment according to claim 1, wherein the nanorods comprise bundles of one-dimensional nano structures of crystalline $Sb_2X_3$, X is S, Se, or Te, grown in a direction.

5. The semipermeable membrane for water treatment according to claim 4, wherein the nanorods comprise an n-type $Sb_2X_3$ or a p-type $Sb_2X_3$.

6. The semipermeable membrane for water treatment according to claim 1, wherein a contact angle between the hydrophobic surface of the photoactive layer and a water droplet is 130° or larger.

7. A semipermeable membrane for water treatment, comprising:
   a first substrate having a surface; and
   nanorods comprising $Sb_2X_3$, X is S, Se, or Te, disposed on the surface,
   wherein the nanorods are three-dimensionally randomly disposed on the surface,
   wherein a plurality of the nanorods is horizontally disposed on the surface to expose a hydrophobic side of the nanorods,
   wherein a plurality of the nanorods is vertically disposed on the surface to expose an end of the nanorods having a dangling bond,
   wherein the nanorods are oriented on the surface to form a nanostructure accommodating an air cavity between the nanorods on the first substrate to form a hydrophobic surface by the Cassie-Baxter effect,
   wherein the nanorods are disposed to expose a (h00) plane, a (h01) plane, or a combination thereof on the surface of the first substrate;
   the surface of the first substrate is impermeable to a polar solvent while permeable to a nonpolar solvent; and
   the nanorods form a photoactive layer that is configured to photodegrade a polluted material in a liquid disposed thereon upon being irradiated by light.

8. The semipermeable membrane of claim 7, wherein the nanorods comprise an n-type $Sb_2X_3$ or a p-type $Sb_2X_3$, where X is S, Se, or Te; and
   the photoactive layer is configured to form a contact angle of 130° or larger between a surface thereof and a water droplet.

9. The semipermeable membrane of claim 7, wherein the first substrate comprises a porous support on which the nanorods are disposed.

10. The semipermeable membrane of claim 7, wherein the first substrate forms a semipermeable membrane that is configured to provide a barrier for water while allowing an organic solvent to penetrate, thereby separating the water from the organic solvent.

11. The semipermeable membrane of claim 7, wherein the nanorods have hydrophilic end portions comprising a dangling bond.

12. The semipermeable membrane of claim 9, wherein the porous support is a mesh support having pores of 1 µm to 200 µm.

13. The semipermeable membrane of claim 9, wherein the porous support is a mesh support comprising platinum.

14. A polluted water treatment system comprising the semipermeable membrane for water treatment recited in claim 1, wherein, when exposed to a polluted water including oil and the polluted material, the semipermeable membrane is configured to allow the oil to penetrate the semipermeable membrane for removal from the polluted water, and the photoactive layer is configured to decompose the polluted material.

15. The polluted water treatment system according to claim 14, wherein the photoactive layer is configured to decompose the polluted material upon light being irradiated onto the photoactive layer.

16. The polluted water treatment system according to claim 14, further comprising:
   a power source which applies a voltage to the photoactive layer.

17. The polluted water treatment system according to claim 16, wherein the power source comprises an energy source selected from a group consisting of a solar cell, a piezoelectric device, a thermoelectric device, a magnetic fluid, a triboelectricity, a photoelectric device, and a combination thereof.

* * * * *